United States Patent
Hayashi et al.

(10) Patent No.: US 7,245,311 B2
(45) Date of Patent: *Jul. 17, 2007

(54) IMAGE FORMING APPARATUS

(75) Inventors: Yoshinori Hayashi, Kanagawa (JP); Taira Kouchiwa, Kanagawa (JP); Yutaka Ebi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 4 days.

This patent is subject to a terminal disclaimer.

(21) Appl. No.: 10/892,152

(22) Filed: Jul. 16, 2004

(65) Prior Publication Data

US 2004/0246330 A1   Dec. 9, 2004

Related U.S. Application Data

(63) Continuation of application No. 09/765,608, filed on Jan. 22, 2001, now Pat. No. 6,803,941.

(30) Foreign Application Priority Data

Feb. 3, 2000   (JP) ............... 2000-026780

(51) Int. Cl.
*B41J 2/385* (2006.01)
*B41J 2/47* (2006.01)

(52) U.S. Cl. ...................... 347/131; 347/251

(58) Field of Classification Search ........... 347/240, 347/251–254, 131–132, 234; 382/299; 358/3.02, 358/3.1–3.12
See application file for complete search history.

(56) References Cited

U.S. PATENT DOCUMENTS

| 5,134,495 | A | * | 7/1992 | Frazier et al. | 382/299 |
|---|---|---|---|---|---|
| 5,193,008 | A | | 3/1993 | Frazier et al. | 358/1.2 |
| 5,270,827 | A | * | 12/1993 | Kobayashi et al. | 358/3.02 |
| 5,365,258 | A | | 11/1994 | Murata et al. | 347/232 |
| 5,412,408 | A | | 5/1995 | Itoh et al. | 101/126 |
| 5,557,448 | A | | 9/1996 | Endo et al. | 359/208 |
| 5,562,670 | A | | 10/1996 | Brånemark | 606/73 |

(Continued)

FOREIGN PATENT DOCUMENTS

JP        04-336859        11/1992

(Continued)

OTHER PUBLICATIONS

U.S. Appl. No. 09/031,410, filed Feb. 26, 1998.

(Continued)

*Primary Examiner*—Hai Pham
(74) *Attorney, Agent, or Firm*—Oblon, Spivak, McClelland, Maier & Neustadt, P.C.

(57) ABSTRACT

A photosensitive body has a photosensitive layer. An optical scanning device has a deflector deflecting a light flux emitted from a light source, and scans the surface of the photosensitive body by the thus-deflected light flux. A dot is formed at a center between adjacent light fluxes as a result of the adjacent light fluxes being overlapped with one another in a sub-scan direction. A ratio of a static beam-spot diameter Ws in the sub-scan direction on the surface of the photosensitive body defined by $1/e^2$ of the maximum value in the exposure distribution of the beam spot to an interval L between adjacent scan lines satisfies the following formula: $1.2 < Ws/L < 4.5$.

4 Claims, 15 Drawing Sheets

U.S. PATENT DOCUMENTS

| | | | | |
|---|---|---|---|---|
| 5,570,224 A | 10/1996 | Endo et al. | ............... | 359/212 |
| 5,581,392 A | 12/1996 | Hayashi | ............... | 359/205 |
| 5,652,670 A | 7/1997 | Hayashi | ............... | 359/205 |
| 5,786,594 A | 7/1998 | Ito et al. | ............... | 250/236 |
| 5,875,051 A | 2/1999 | Suzuki et al. | ............... | 359/205 |
| 5,936,756 A | 8/1999 | Nakajima | ............... | 359/208 |
| 5,986,791 A | 11/1999 | Suzuki et al. | ............... | 359/207 |
| 5,999,345 A | 12/1999 | Nakajima et al. | ............... | 359/821 |
| 6,052,211 A | 4/2000 | Nakajima | ............... | 359/204 |
| 6,069,724 A | 5/2000 | Hayashi et al. | ............... | 359/206 |
| 6,081,386 A | 6/2000 | Hayashi et al. | ............... | 359/64.1 |
| 6,091,534 A | 7/2000 | Nakajima | ............... | 359/208 |
| 6,104,522 A | 8/2000 | Hayashi et al. | ............... | 359/207 |
| 6,141,133 A | 10/2000 | Suzuki et al. | ............... | 359/207 |
| 6,185,026 B1 | 2/2001 | Hayashi et al. | ............... | 359/204 |
| 6,198,562 B1 | 3/2001 | Hayashi et al. | ............... | 359/204 |
| 6,222,662 B1 | 4/2001 | Suzuki et al. | ............... | 359/205 |
| 6,229,638 B1 | 5/2001 | Sakai et al. | ............... | 359/212 |
| 6,233,081 B1 | 5/2001 | Suzuki et al. | ............... | 359/212 |
| 6,239,860 B1 | 5/2001 | Ito | ............... | 355/41 |
| 6,317,246 B1 | 11/2001 | Hayashi et al. | ............... | 359/204 |
| 6,369,927 B2 | 4/2002 | Hayashi | ............... | 359/196 |
| 6,384,949 B1 | 5/2002 | Suzuki | ............... | 359/196 |
| 6,388,792 B1 | 5/2002 | Atsuumi et al. | ............... | 359/207 |
| 6,400,391 B1 | 6/2002 | Suhara et al. | ............... | 347/244 |
| 6,400,917 B2 | 6/2002 | Nakazato et al. | ............... | 399/111 |
| 6,417,509 B1 | 7/2002 | Atsuumi et al. | ............... | 250/234 |
| 6,429,956 B2 | 8/2002 | Itabashi | ............... | 359/204 |
| 6,445,482 B1 | 9/2002 | Hayashi | ............... | 359/205 |
| 6,448,998 B1 | 9/2002 | Suzuki et al. | ............... | 347/258 |
| 6,462,853 B2 | 10/2002 | Hayashi et al. | ............... | 359/205 |
| 6,485,126 B1 | 11/2002 | Kato et al. | ............... | 347/54 |
| 6,496,293 B2 | 12/2002 | Kawamura | ............... | 359/212 |
| 6,497,474 B2 | 12/2002 | Irinoda et al. | ............... | 359/204 |
| 6,498,617 B1 | 12/2002 | Ishida et al. | ............... | 347/252 |
| 6,509,995 B1 | 1/2003 | Suzuki et al. | ............... | 359/196 |
| 6,573,921 B2 | 6/2003 | Hayashi | ............... | 347/131 |
| 6,587,245 B2 | 7/2003 | Hayashi | ............... | 359/204 |
| 6,596,985 B2 | 7/2003 | Sakai et al. | ............... | 250/234 |
| 6,621,512 B2 | 9/2003 | Nakajima et al. | ............... | 347/245 |
| 6,624,920 B2 | 9/2003 | Itabashi | ............... | 359/205 |
| 6,657,761 B2 | 12/2003 | Suzuki et al. | ............... | 359/205 |
| 6,657,765 B2 | 12/2003 | Hayashi et al. | ............... | 359/225 |
| 6,690,404 B2 | 2/2004 | Shimada et al. | ............... | 347/115 |
| 6,700,687 B1 | 3/2004 | Itabashi | ............... | 359/212 |
| 6,704,129 B2 | 3/2004 | Sakai et al. | ............... | 359/212 |
| 6,731,317 B2 | 5/2004 | Ema et al. | ............... | 347/135 |
| 6,744,545 B2 | 6/2004 | Suhara et al. | ............... | 359/205 |
| 6,747,818 B2 | 6/2004 | Ohashi et al. | ............... | 359/806 |
| 6,757,089 B2 | 6/2004 | Hayashi | ............... | 359/212 |
| 6,768,506 B2 | 7/2004 | Hayashi et al. | ............... | 247/235 |
| 6,771,296 B2 | 8/2004 | Hayashi et al. | ............... | 347/116 |
| 6,771,407 B2 | 8/2004 | Hayashi et al. | ............... | 359/205 |
| 6,775,041 B1 | 8/2004 | Nakajima | ............... | 359/204 |
| 6,785,028 B1 | 8/2004 | Atsuumi et al. | ............... | 359/196 |
| 6,788,444 B2 | 9/2004 | Suzuki et al. | ............... | 359/196 |
| 2002/0051137 A1 | 5/2002 | Ema et al. | ............... | 358/1.1 |
| 2002/0080428 A1 | 6/2002 | Suzuki et al. | ............... | 359/505 |
| 2002/0093566 A1 | 7/2002 | Kawamura | ............... | 348/203 |
| 2002/0100869 A1 | 8/2002 | Hayashi | ............... | 250/234 |
| 2002/0101494 A1 | 8/2002 | Ono | ............... | 347/115 |
| 2002/0101642 A1 | 8/2002 | Masuda | ............... | 359/196 |
| 2002/0105707 A1 | 8/2002 | Hayashi | ............... | 359/196 |
| 2002/0114051 A1 | 8/2002 | Atsuumi | ............... | 359/205 |
| 2002/0122217 A1 | 9/2002 | Nakajima | ............... | 358/505 |
| 2002/0131137 A1 | 9/2002 | Suzuki | ............... | 359/205 |
| 2002/0171878 A1 | 11/2002 | Nakajima | ............... | 358/505 |
| 2003/0053156 A1 | 3/2003 | Satoh et al. | ............... | 358/511 |
| 2003/0067533 A1 | 4/2003 | Omori et al. | ............... | 347/248 |
| 2003/0072066 A1 | 4/2003 | Hayashi et al. | ............... | 359/201 |
| 2003/0179428 A1 | 9/2003 | Suzuki et al. | ............... | 359/204 |
| 2003/0206322 A1 | 11/2003 | Atsuumi et al. | ............... | 359/205 |
| 2003/0210928 A1 | 11/2003 | Miyaguchi et al. | ............... | 399/252 |
| 2003/0214693 A1 | 11/2003 | Hayashi et al. | ............... | 359/204 |
| 2004/0001241 A1 | 1/2004 | Hayashi et al. | ............... | 359/216 |
| 2004/0246330 A1 | 12/2004 | Hayashi et al. | | |

FOREIGN PATENT DOCUMENTS

| | | | |
|---|---|---|---|
| JP | 04336859 A | * 11/1992 | |
| JP | 06-071940 | 3/1994 | |
| JP | 10-181091 | 7/1998 | |
| JP | 10-250144 | 9/1998 | |
| JP | 10250144 A | * 9/1998 | |

OTHER PUBLICATIONS

U.S. Appl. No. 09/860,520, filed May 21, 2001, Hayashi et al.
U.S. Appl. No. 09/827,097, filed Apr. 6, 2001, Ono et al.
U.S. Appl. No. 09/769,510, filed Jan. 26, 2001, Nakajima et al.
U.S. Appl. No. 09/678,611, filed Oct. 4, 2000, Sakai et al.
U.S. Appl. No. 10/642,173, filed Aug. 18, 2003, Ono et al.

* cited by examiner

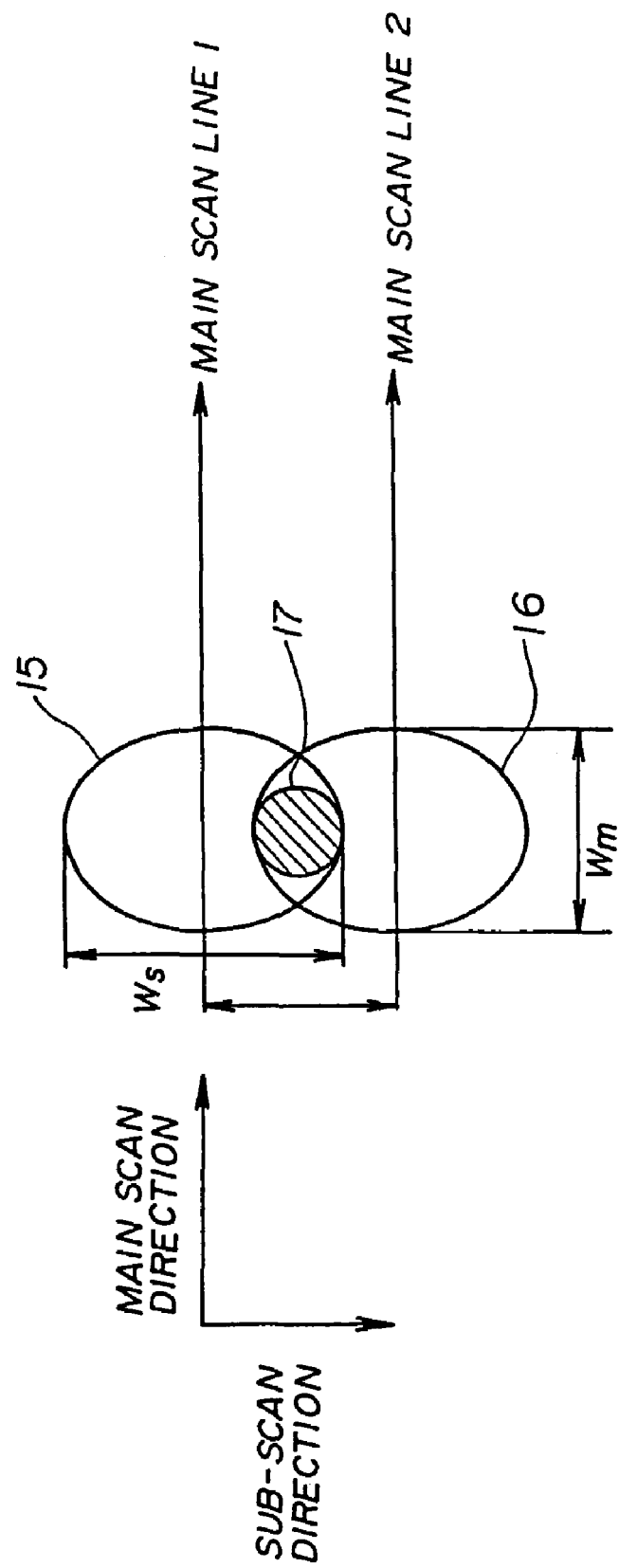

FIG.5

| | L (μm) | Wm (μm) | Ws (μm) | Ws/L | Wm/Ws | RESOLUTION (dpi) |
|---|---|---|---|---|---|---|
| COMPARISON EXAMPLE | 42.3 | 42.3 | 42.3 | 1.00 | 1.00 | 600 |
| EMBODIMENT 1 | 42.3 | 50.2 | 51.2 | 1.21 | 0.98 | 600 |
| EMBODIMENT 2 | 42.3 | 58.2 | 76.6 | 1.81 | 0.76 | 600 |
| EMBODIMENT 3 | 42.3 | 89.4 | 105.8 | 2.50 | 0.84 | 600 |
| EMBODIMENT 4 | 42.3 | 74.0 | 148.1 | 3.50 | 0.50 | 600 |
| EMBODIMENT 5 | 42.3 | 53.3 | 59.2 | 1.40 | 0.90 | 600 |
| EMBODIMENT 6 | 21.2 | 24.9 | 25.6 | 1.21 | 0.97 | 1200 |
| EMBODIMENT 7 | 21.2 | 26.7 | 29.7 | 1.40 | 0.90 | 1200 |
| EMBODIMENT 8 | 21.2 | 29.2 | 38.4 | 1.81 | 0.76 | 1200 |
| EMBODIMENT 9 | 21.2 | 45.1 | 53.0 | 2.50 | 0.84 | 1200 |
| EMBODIMENT 10 | 21.2 | 28.6 | 95.3 | 4.49 | 0.30 | 1200 |

IMAGE FORMING APPARATUS

This application is a Continuation of application Ser. No. 09/765,608 filed on Jan. 22, 2001 now U.S. Pat. No. 6,803,941.

BACKGROUND OF THE INVENTION

1. Field of the Invention

The present invention generally relates to an image forming apparatus which forms an image on a surface of a photosensitive body through an optical scanning device, and, in particular, to an image forming apparatus by which, even employing a device having a low resolution, an apparatus having an apparently high resolution is provided.

2. Description of the Related Art

Recently, improvement in resolution of an image forming apparatus has been demanded as in an LBP (laser beam printer) and so forth.

In order to render high resolution without increasing the printing speed of an LBP, ① the speed of rotation of a deflector such as a polygon scanner may be increased, ② the number of light sources may be increased and thereby scanning is rendered with a plurality of scan lines at once, or the like.

However, ① when the speed of rotation of a deflector such as a polygon scanner is increased, not only the polygon scanner itself becomes expensive, but also the durability thereof becomes degraded, the noise therefrom increases, the power consumption thereof increases, and so forth.

Further, when ② the number of light sources is increased and thereby scanning is rendered with a plurality of scan lines at once, a configuration for composing a plurality of beams becomes complicated, the number of parts/components increases, thereby costs increasing, and assembling accuracy of the mounted parts/components cannot be maintained because of complexity of the device.

Further, improvement of resolution only in a main scan direction (the same as a deflection direction of a deflector) can be rendered by increasing a modulation frequency of a light source. However, by this method, it is not possible to improve resolution in a sub-scan direction.

As a method of solving the above-mentioned problems, and improving resolution in a main scan direction and also in a sub-scan direction, TrueRes technology is proposed in a document 'technology of improving resolution of page printer—TrueRes Interface January/February, 1996'. This method has also been put into practice.

The TrueRes technology is to utilize a characteristic in that a toner-adhering amount of toner adhering to a surface of a photosensitive body with respect to an exposure time for which the photosensitive body is exposed by a beam is determined by an accumulation of the exposure time (exposure distribution).

FIG. 1 shows a characteristic of an exposure time and a toner-adhering amount.

In FIG. 1, in a range in that the exposure time 't' is not longer than t3 ($t \leq t3$), a reaction critical value has not been exceeded, and the toner-adhering amount TM is substantially zero.

In a range in that the exposure time falls between t3 and t4 (t3<t<t4), the reaction critical value has been exceeded. Then, in a range in that the exposure time t is equal to or longer than t4 ($t \geq t4$), the toner-adhering amount TM becomes TM0, and is saturated.

Because the toner-adhering amount is thus determined by accumulation of the exposure time, the toner-adhering amount becomes TM0 by four times of exposure each rendered for the interval t1, and, this is the same as the toner-adhering amount rendered by once of exposure rendered for the interval t4.

Similarly, in a case where exposure is rendered for the interval t2, the toner-adhering amount reaches TM0 by twice of the exposure.

FIG. 2 shows an image of improving resolution employing the TrueRes technology.

In FIG. 2, G11 through G13 represent dots formed on a scan line L1, G21 through G23 represent dots formed on a scan line L2, and, for each of them, exposure is rendered for an interval equal to or longer than t4 in the characteristic shown in FIG. 1, and, thereby, the toner-adhering amount is TM0.

Further, dots GA formed between adjacent dots can be formed through twice of exposure each rendered for the interval t2 in the characteristic shown in FIG. 1 on the positions of these adjacent dots, respectively.

For example, a new dot GA can be formed between the dots G11 and G12 on the main scan line L1 in the main scan direction, and another new dot GA can be formed between the dot G11 on the main scan line L1 and the dot G21 on the main scan line L2 in the sub-scan direction.

Thus, by employing the TrueRes technology, it is possible to improve resolution in the main scan direction and also in the sub-scan direction.

Further, in an image forming apparatus in the related art, as disclosed in Japanese Laid-Open Patent Application No. 10-250144 by the present applicant, by employing the TrueRes technology, employing a plurality of LED (light emitting diode) arrays in a light source thereof, configuring the respective LED arrays in the main scan direction of a photosensitive body, and controlling turning on/off of each diode, new dots are formed between adjacent normal dots in the main scan direction and in the sub-scan direction.

In the image forming apparatus disclosed in Japanese Laid-Open Patent Application No. 10-250144, the diameters of newly formed dots can be made to approximate those of the normal dots.

In the image forming apparatus disclosed in Japanese Laid-Open Patent Application No. 10-250144 employing the TrueRes technology, resolution of newly formed dots is determined by exposure distribution, and, also, the exposure distribution is mainly determined by a static beam-spot diameter and intervals between scan lines in the sub-scan direction. Accordingly, the resolution is not improved unless the static beam-spot diameter and intervals between scan lines in the sub-scan direction are properly set.

SUMMARY OF THE INVENTION

The present invention has been devised in order to solve such a problem, and an object of the present invention is to provide an image forming apparatus in which the static beam-spot diameter and intervals between scan lines in the sub-scan direction are properly set, and, thereby, resolution in the sub-scan direction is improved.

Another object of the present invention is to set a condition of improving resolution in the main scan direction.

According to the present invention, a dot is formed at a center between adjacent light fluxes as a result of the adjacent light fluxes being overlapped with one another in a sub-scan direction, and a ratio of a static beam-spot diameter Ws in the sub-scan direction on the surface of a photosensitive body defined by $1/e^2$ of the maximum value in the exposure distribution of the beam spot (the diameter of the area of the beam spot through which the exposure intensity is not lower than $1/e^2$ of the maximum value thereof, also hereinafter) to an interval L (in a center-to-center basis, also hereinafter) between adjacent scan lines satisfies the following formula:

$$1.2 < Ws/L < 4.5$$

Thereby, it is possible to easily form a dot at the center between adjacent scan lines, to render shortening of a diameter of each dot and stabilization of the dots and to increase resolution in the sub-scan direction. Accordingly, it is possible to form high-resolution images.

Further, a ratio of a static beam-spot diameter Wm in a main scan direction on the surface of the photosensitive body defined by $1/e^2$ of the maximum value in the exposure distribution of the beam spot to the static beam-spot diameter Ws in the sub-scan direction on the surface of the photosensitive body defined by $1/e^2$ of the maximum value in the exposure distribution of the beam spot satisfies the following formula:

$$Wm/Ws < 1$$

Thereby, it is possible to increase resolution in the main scan direction, and to form high-resolution images also high in resolution in the main scan direction.

Other objects and further features of the present invention will become more apparent from the following detailed description when read in conjunction with the accompanying drawings.

BRIEF DESCRIPTION OF THE DRAWINGS

FIG. 4 shows an image of forming a new dot for increasing resolution in a sub-scan direction according to the present invention;

FIG. 5 shows conditions of a comparison example and the first through tenth embodiments of the present invention;

DETAILED DESCRIPTION OF THE PREFERRED EMBODIMENTS

Figure 3A:
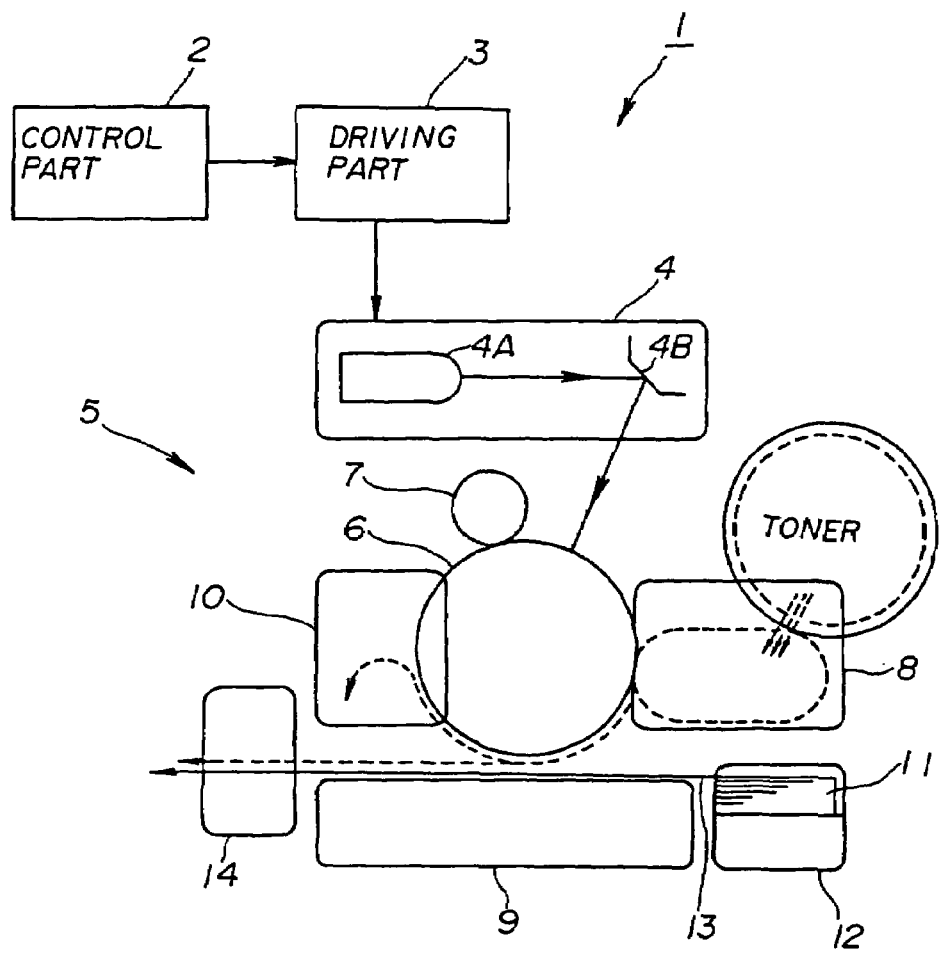
FIGS. 3A and 3B show a general configuration of an image forming apparatus in each of first through tenth embodiments of the present invention.
Figure 3B:
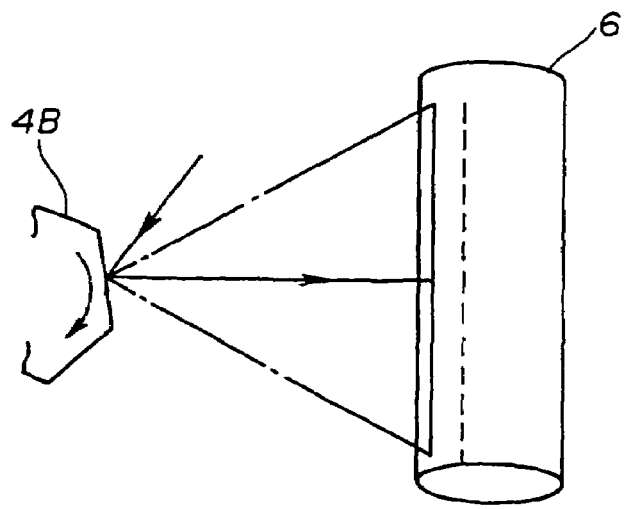

FIGS. 3A and 3B show a general configuration of an image forming apparatus in each embodiment of the present invention.

In FIG. 3A, the image forming apparatus 1 includes a control part 2 having a microprocessor as a base and a memory, and having an operation function and a processing function, and controlling operation of the entirety of the apparatus, a driving part 3 driving an optical scanning device 4 based on a control signal and an image signal provided by the control part 2, the optical scanning device 4 having a laser diode 4A, a polygon mirror 4B and so fourth, and scanning a photosensitive body 6 having a photosensitive layer in a main scan direction thereof by a laser beam reflected by the polygon mirror 4B, and an image process part 5 provided in a paper passage 13 communicating a paper feeding device 12 containing transfer paper 11, which is recording media, with a paper ejecting part not shown in the figure.

The image process part 5 includes the photosensitive body 6 having a configuration of a photosensitive dram as a main part, and, a charging device 7, a developing device 8, a transfer device 9 and a cleaning device 10 arranged around the photosensitive body 6.

The charging device 7 charges a surface of the photosensitive body 6 to one polarity (for example, a minus (−) polarity) uniformly through charging by a roller charging method.

When the optical scanning device 4 applies a laser beam to the photosensitive body 6, an electrostatic latent image (beam spot) is formed at a portion at which the laser beam is applied to. When the laser beam is deflected as the polygon mirror 4B rotates, shown in FIG. 3B, the electrostatic latent image is formed in the main scan direction of the photosensitive body 6.

The developing device 8 causes toner having an electric-potential difference with respect to the electrostatic latent image to adhere to the electrostatic latent image formed on the photosensitive body 6. Thereby, the electrostatic latent image is visualized.

The transfer device 9 attracts the thus-visualized toner image from the photosensitive body 6 by an electric-potential difference, and transfers the toner image onto the transfer paper 11.

The cleaning device 10 removes the toner remaining on the photosensitive body 6 after the transfer, by a method of scraping or the like, and, thus, cleans the photosensitive body 6.

A fixing device 14 is disposed on the downstream side of the transfer device 9 in the paper passage 13, heats and presses the un-fixed toner adhering to the transfer paper 11 having passed through the transfer device 9, and, thus, fixes the toner onto the transfer paper 11.

The control part 2 modulates an image signal through the driving part 3, controls light-emitting intensity or light-emitting time of the laser beam like a pulse according to resolution (for example, 600 dpi. 1200 dpi, or the like) of the apparatus emitted from the laser diode 4A, and controls the rotation of the polygon mirror 4B.

Further, the control part 2 controls the rotation of the drum of the photosensitive body 6, and, when scanning one scan line the surface of the photosensitive body 6 is finished, rotates the drum for a scan-line interval L, so that the laser beam scans a subsequent scan line.

Further, the control part 2 controls operation and timing of the charging device 7, developing device 8, transfer device 9 and cleaning device 10 of the image process part 5 other than the photosensitive body 6.

FIG. 4 shows an image of forming new dots for improving resolution in the sub-scan direction.

When beam spots are formed at the scan-line interval L, the resolution in the sub-scan direction is 1/L (dpi). However, by forming a dot at a position at which beam spots 15 and 16 overlap with one another, it is possible to improve the resolution in the sub-scan direction.

In FIG. 4, the beam spot 15 is a beam spot formed on a main scan line 1 and the beam spot 16 is a beam spot formed on a main scan line 2.

The new dot 17 (hatched in the figure) is formed at the position at which the beam spots 15 and 16 overlap with one another in the sub-scan direction between the main scan line 1 and main scan line 2.

However, unless the static beam-spot diameter and interval between scan lines in the sub-scan direction are properly set, not only the resolution is not improved, but also it is not possible to reproduce image information precisely, and it may even result in degradation in image quality.

A condition for improving the resolution in the sub-scan direction without degrading the image quality is that a ratio of the static beam-spot diameter Ws in the sub-scan direction on the surface of the photosensitive body defined by 1/e² of the maximum value in the exposure distribution of the beam spot to the interval L between adjacent scan lines in the sub-scan direction is set so that the following formula (1) is satisfied:

$$1.2 < Ws/L < 4.5 \tag{1}$$

When the ratio Ws/L in the above formula (1) is not larger than the lower limit 1.2, no new dot is formed at a center between the two adjacent scan lines in overlapped exposure distributions of the two beam spots, but two dots separate in the sub-scan direction are newly formed.

When Ws/L in the above formula (1) is not smaller than the upper limit 4.5, the diameter of the static beam spot is too large with respect to the scan-line interval L, and the new dot is too large and/or is unstable. Thereby, it is not possible to render high resolution.

Further, in order to make resolution equal between the main scan direction and sub-scan direction, beam spots apart by the half of the scan-line interval (L/2) in a center-to-center basis are made separate as far as possible for the main scan direction while the part at which two beam spots with the scan-line interval L overlap with one another is utilized for the sub-scan direction.

At this time, it is necessary that the ratio of the static beam-spot diameter Wm in the main scan direction defined by 1/e² of the maximum value in the exposure distribution of the beam spot on the surface of the photosensitive body to the static beam-spot diameter Ws in the sub-scan direction defined by 1/e² of the maximum value in the exposure distribution of the beam spot on the surface of the photosensitive body satisfies the following formula (2):

$$Wm/Ws < 1 \tag{2}$$

When Wm/Ws in the formula (2) is not smaller than the upper limit 1, the beam-spot diameter Wm in the main scan direction is too large with respect to the dot interval in the main scan direction, and, thereby, dots are thickened, and/or, unstable. Accordingly, it is not possible to render high resolution.

Reasons why the above-mentioned formulas (1) and (2) are reasonable will now be described based on a comparison example and the embodiments of the present invention.

FIG. 5 shows conditions of the comparison example and embodiments of the present invention.

In each of the comparison example and embodiments 1 through 10, a new dot formed in the sub-scan direction is formed from overlapping, with one another, two beam spots on main scan lines adjacent in the sub-scan direction with the scan-line interval of L.

Further, the beam spot moves in the main scan direction while the light source (laser light) is turned on, and each moving distance is assumed to be ¼ of the scan-line interval L (L/4).

Further, the shape of a static beam spot is assumed to be of an ideal Gaussian distribution.

Further, each of Wm and Ws is a diameter of a beam spot in a stationary state defined by $1/e^2$ of the maximum value in the exposure distribution of the beam spot.

FIGS. 6 through 16 show perspective views of the exposure distributions in intensity of the comparison example and 1 through 10 embodiments of the present invention, and FIGS. 17 through 27 show the exposure distributions in intensity each on a section passing through the point at which the exposure distribution has the maximum value in intensity and in parallel to the sub-scan direction.

In each figure, the intensity of exposure distribution is normalized so that the maximum value is 100, and, it is assumed that, when the exposure intensity exceeds 50% of the maximum value, a new dot is formed there.

Figure 6:
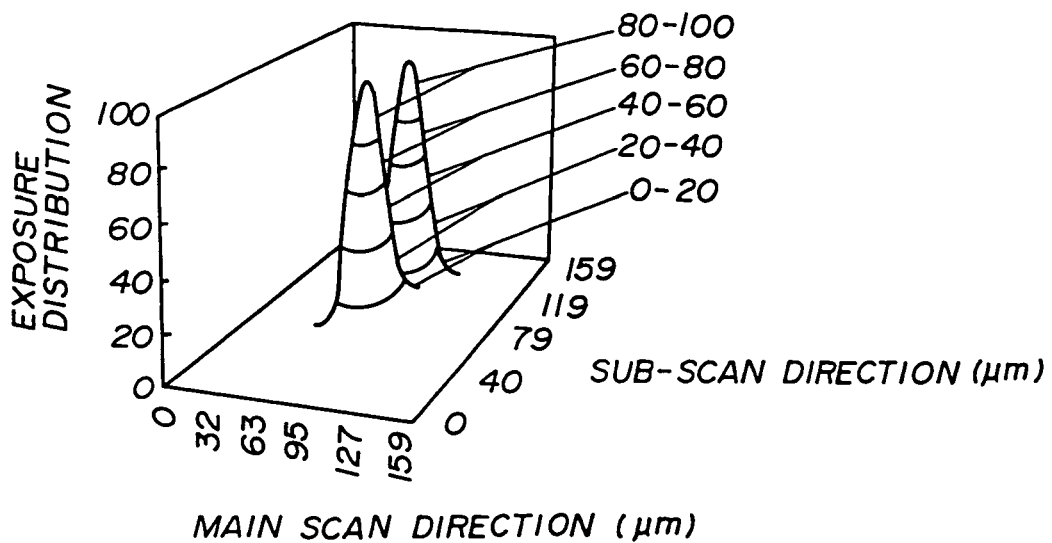
FIG. 6 shows a perspective view (bird's-eye view) of exposure distribution in the comparison example.
Figure 17:
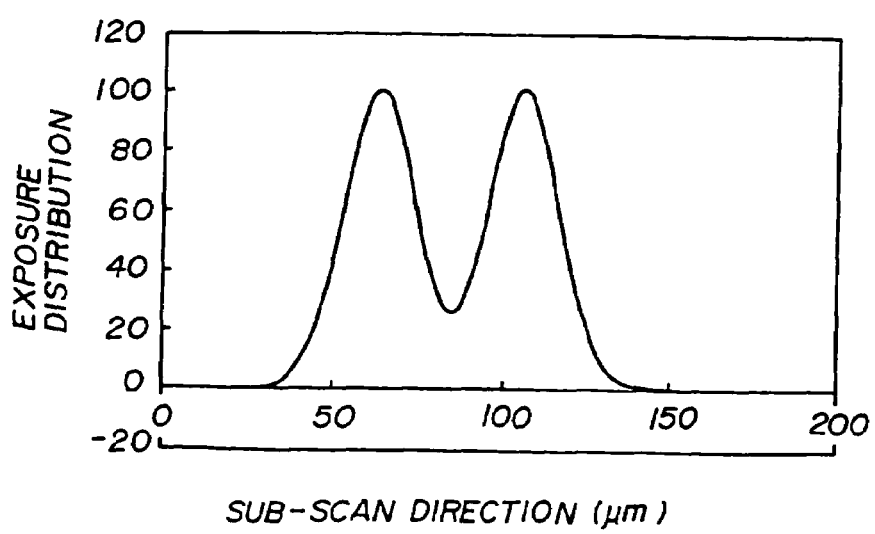
FIG. 17 shows an exposure distribution of the comparison example on a section parallel to a sub-scan direction and passing through a point at which the exposure distribution has the maximum value.

In the comparison example shown in FIGS. 6 and 17, two dots are separate, and the exposure intensity at the center between adjacent scan lines is far smaller than 50% of the maximum value. Accordingly, no new dot cannot be formed there.

In this comparison example, Ws/L=1, and, thus, the condition of the formula (1) is not satisfied.

Figure 7:
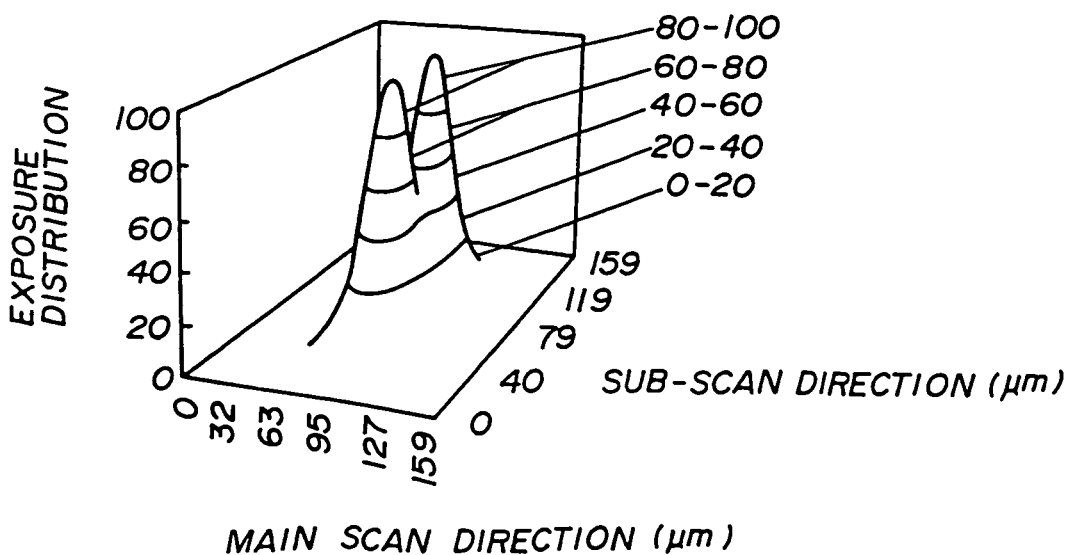
FIG. 7 shows a perspective view (bird's-eye view) of exposure distribution in the first embodiment of the present invention.
Figure 12:
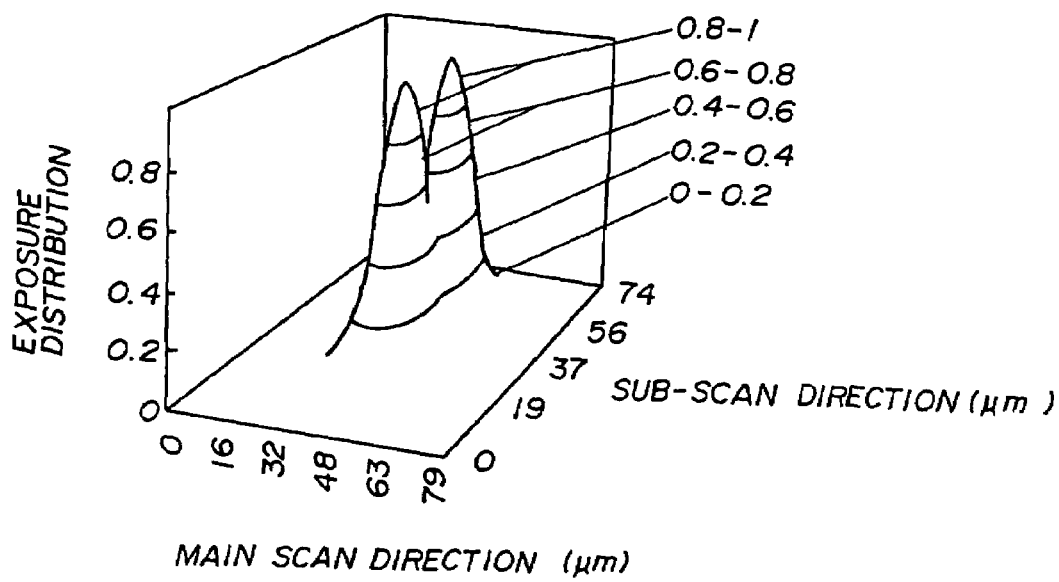
FIG. 12 shows a perspective view (bird's-eye view) of exposure distribution in the sixth embodiment of the present invention.
Figure 18:
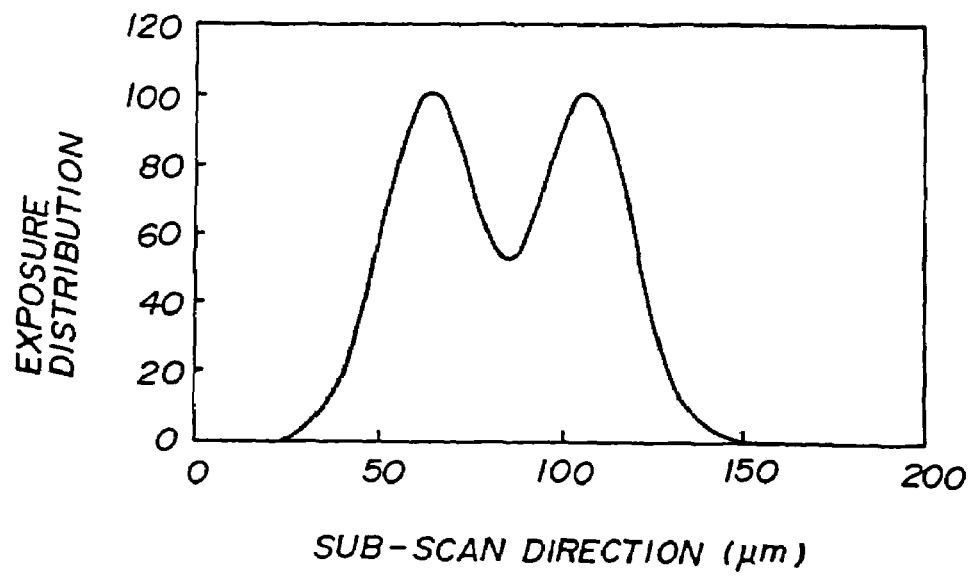
FIG. 18 shows an exposure distribution of the first embodiment of the present invention on a section parallel to the sub-scan direction and passing through a point at which the exposure distribution has the maximum value.
Figure 23:
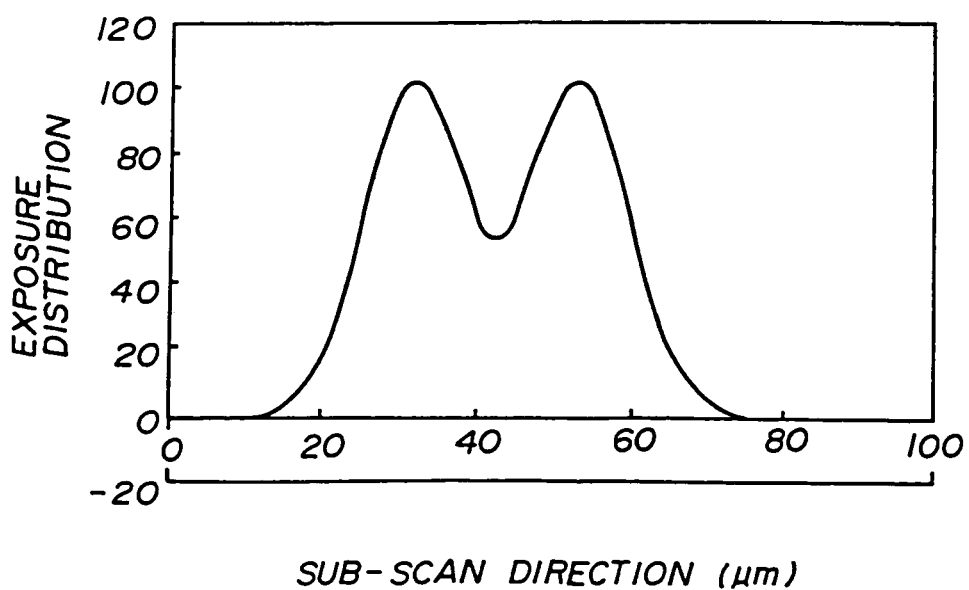
FIG. 23 shows an exposure distribution of the sixth embodiment of the present invention on a section parallel to the sub-scan direction and passing through a point at which the exposure distribution has the maximum value.

In each of the embodiment 1 shown in FIGS. 7 and 18, and the embodiment 6 shown in FIGS. 12 and 23, there is no peak at the center between adjacent scan lines. However, the exposure intensity at the center exceeds 50% of the maximum value. Accordingly, a new dot can be formed at the center.

In each of the embodiment 1 and 6, Ws/L=1.21. Thus, this value is very near to the lower limit 1 of the formula (1).

As described above, when the exposure intensity exceeds 50% of the maximum value at the center between adjacent scan lines, a new dot can easily be formed at the center between the adjacent scan lines, and, Ws/L is equal to the lower limit value 1 when the exposure intensity at the center of the adjacent scan lines is 50% of the maximum value.

Figure 11:
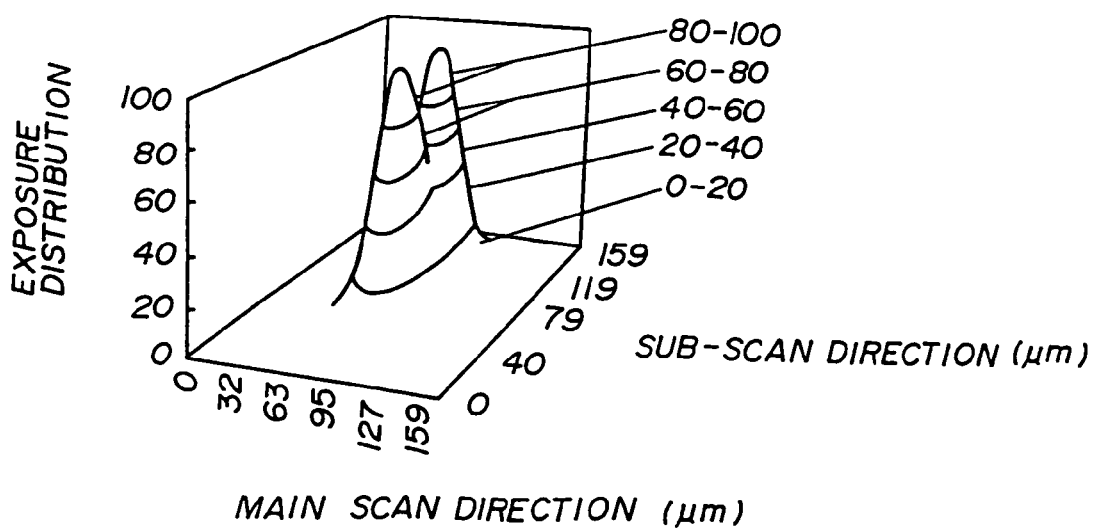
FIG. 11 shows a perspective view (bird's-eye view) of exposure distribution in the fifth embodiment of the present invention.
Figure 13:
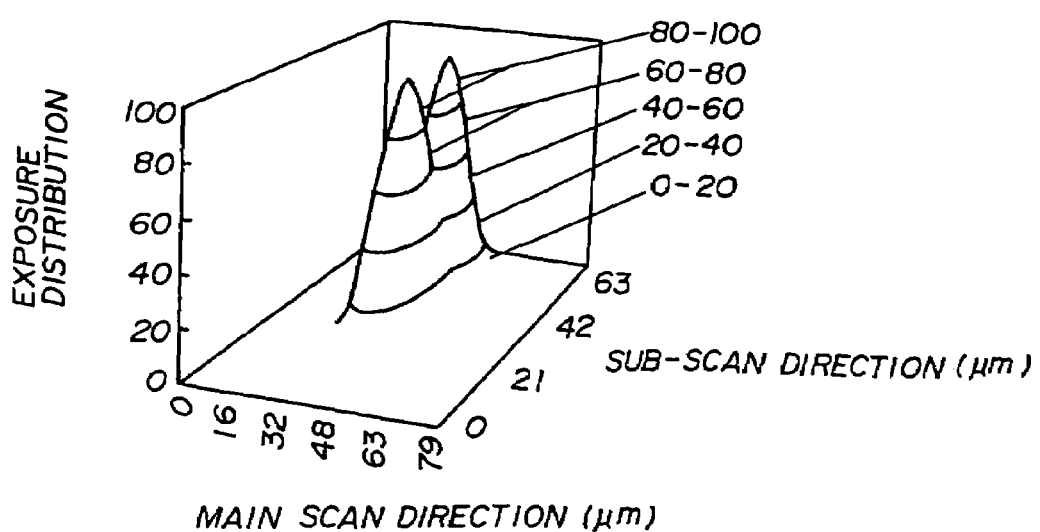
FIG. 13 shows a perspective view (bird's-eye view) of exposure distribution in the seventh embodiment of the present invention.
Figure 22:
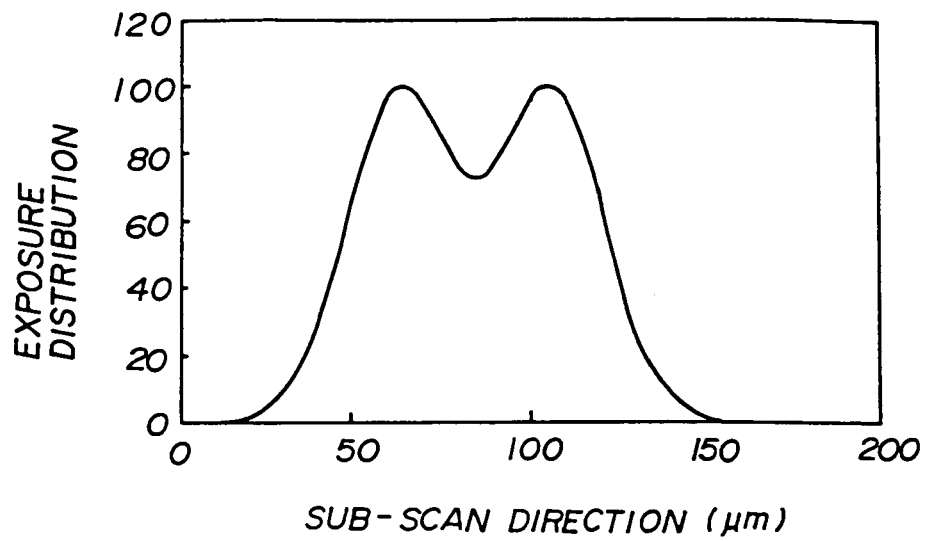
FIG. 22 shows an exposure distribution of the fifth embodiment of the present invention on a section parallel to the sub-scan direction and passing through a point at which the exposure distribution has the maximum value.
Figure 24:
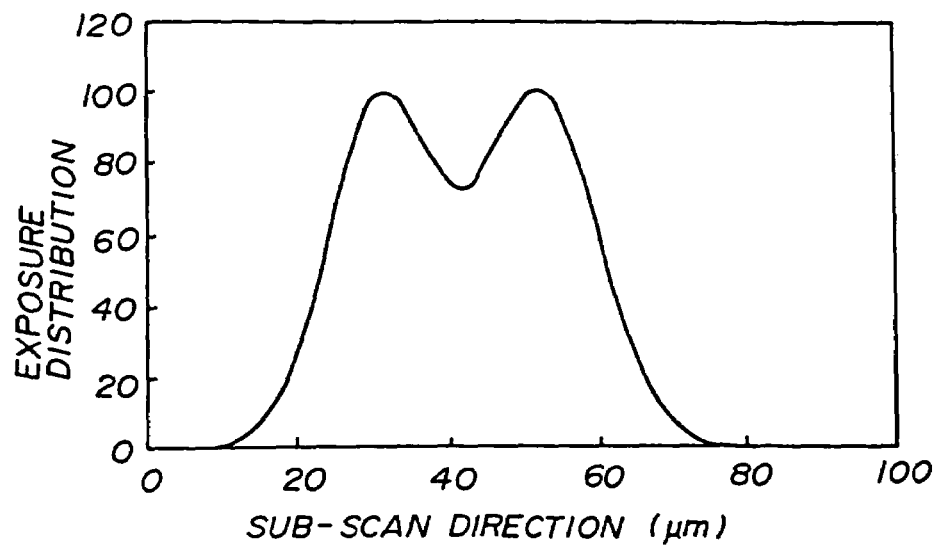
FIG. 24 shows an exposure distribution of the seventh embodiment of the present invention on a section parallel to the sub-scan direction and passing through a point at which the exposure distribution has the maximum value.

In each of the embodiment 5 shown in FIGS. 11 and 22 and the embodiment 7 shown in FIGS. 13 and 24, Ws/L=1.40, and there is no peak at the center between adjacent scan lines. However, the exposure intensity at the center exceeds 50% of the maximum value, and, also, is higher than those in the embodiments 1 and 6. Accordingly, a new dot can be formed at the center more positively.

Figure 8:
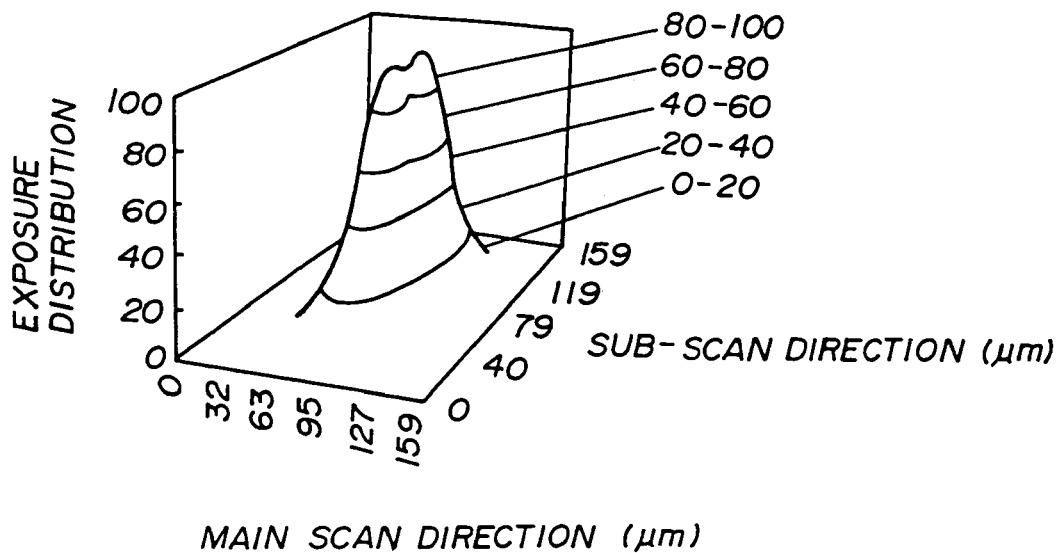
FIG. 8 shows a perspective view (bird's-eye view) of exposure distribution in the second embodiment of the present invention.
Figure 14:
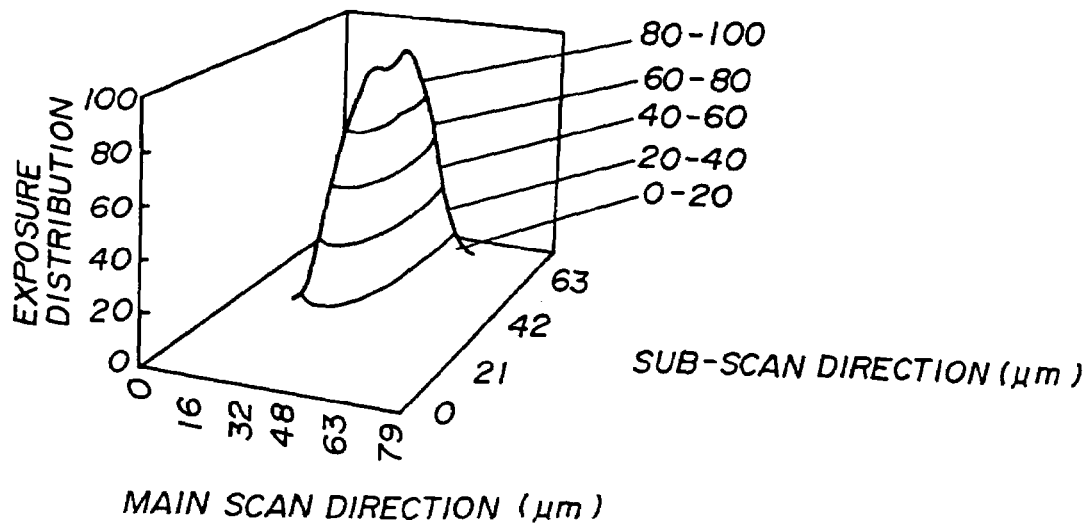
FIG. 14 shows a perspective view (bird's-eye view) of exposure distribution in the eighth embodiment of the present invention.
Figure 19:
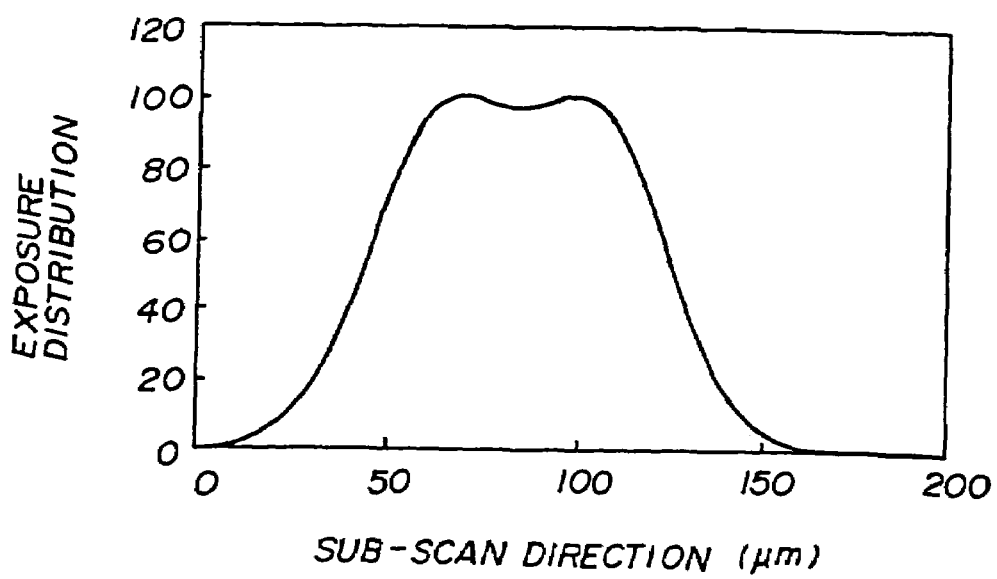
FIG. 19 shows an exposure distribution of the second embodiment of the present invention on a section parallel to the sub-scan direction and passing through a point at which the exposure distribution has the maximum value.
Figure 25:
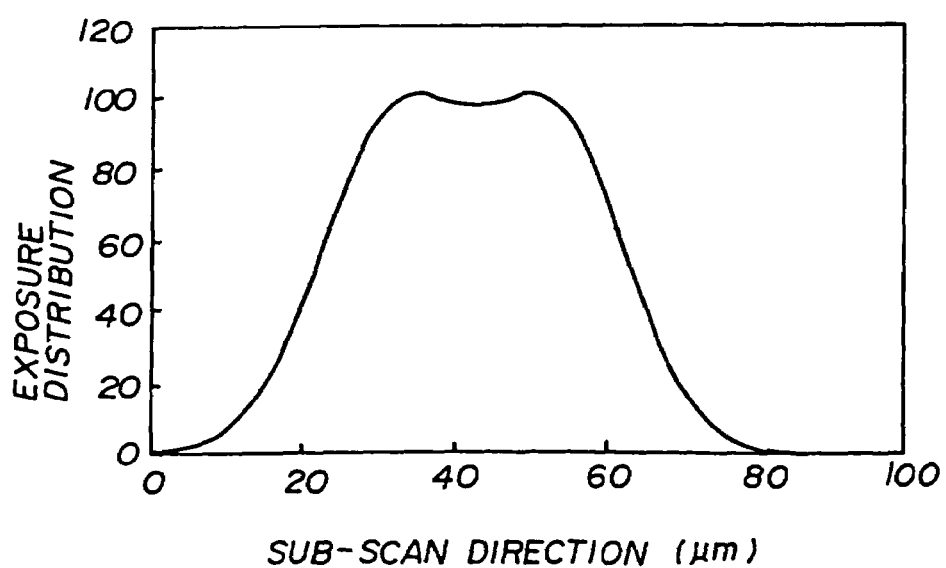
FIG. 25 shows an exposure distribution of the eighth embodiment of the present invention on a section parallel to the sub-scan direction and passing through a point at which the exposure distribution has the maximum value.

In each of the embodiment 2 shown in FIGS. 8 and 19 and the embodiment 8 shown in FIGS. 14 and 25, Ws/L=1.81. Accordingly, a new dot can be formed at the center between adjacent scan lines far more positively.

Figure 1:
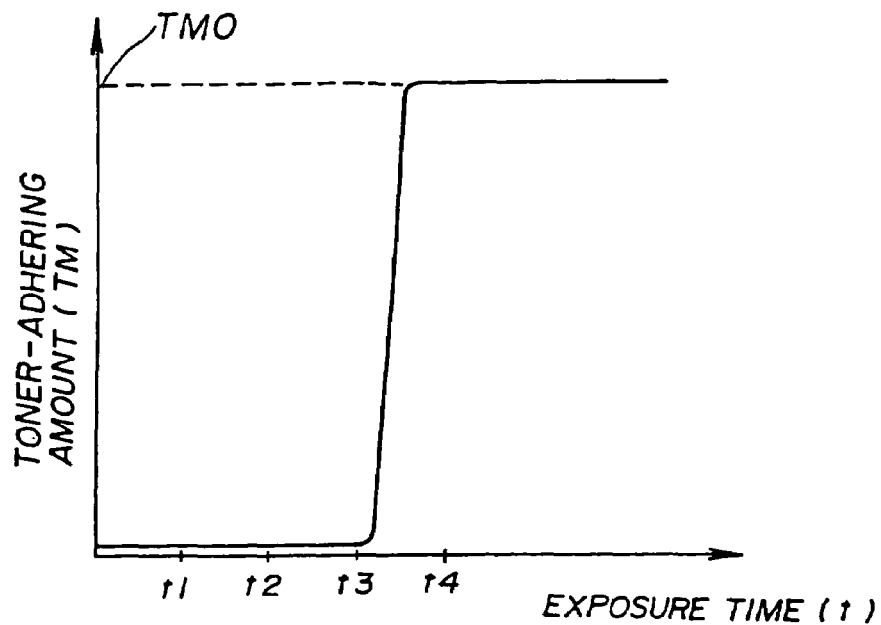
FIG. 1 shows a characteristic between exposure time and toner-adhering amount.
Figure 2:
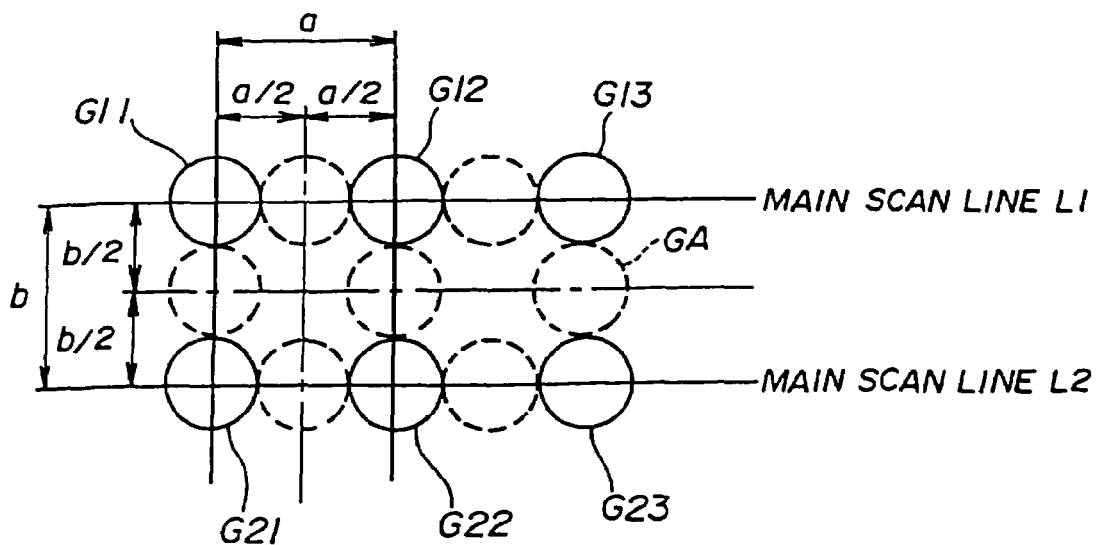
FIG. 2 shows an image of increasing resolution by using TrueRes technology.
Figure 9:
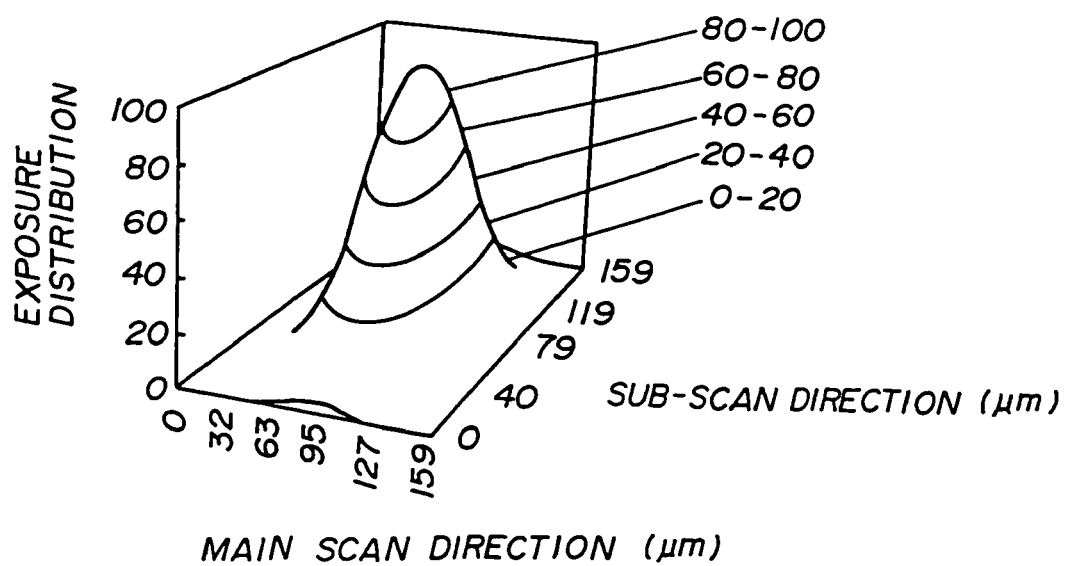
FIG. 9 shows a perspective view (bird's-eye view) of exposure distribution in the third embodiment of the present invention.
Figure 10:
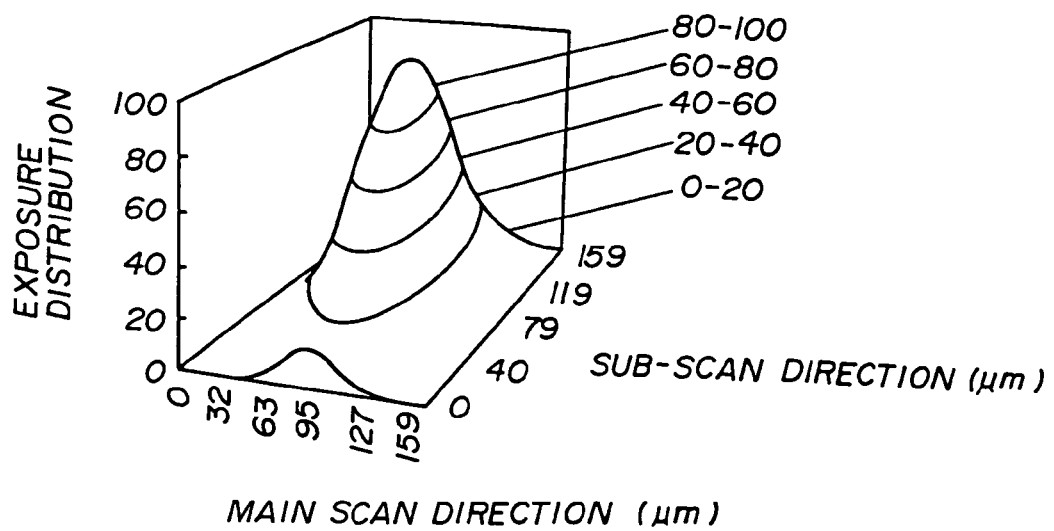
FIG. 10 shows a perspective view (bird's-eye view) of exposure distribution in the fourth embodiment of the present invention.
Figure 15:
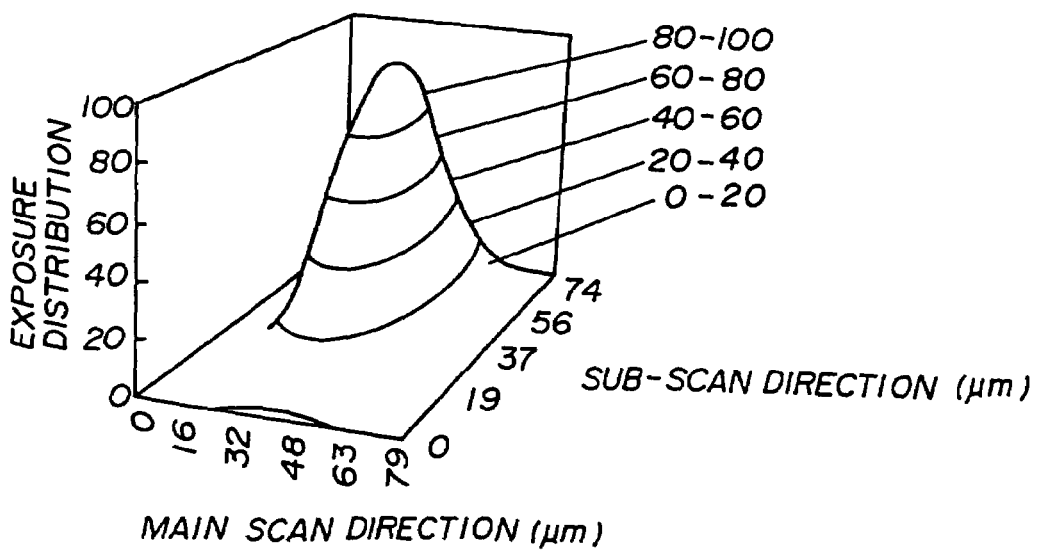
FIG. 15 shows a perspective view (bird's-eye view) of exposure distribution in the ninth embodiment of the present invention.
Figure 16:
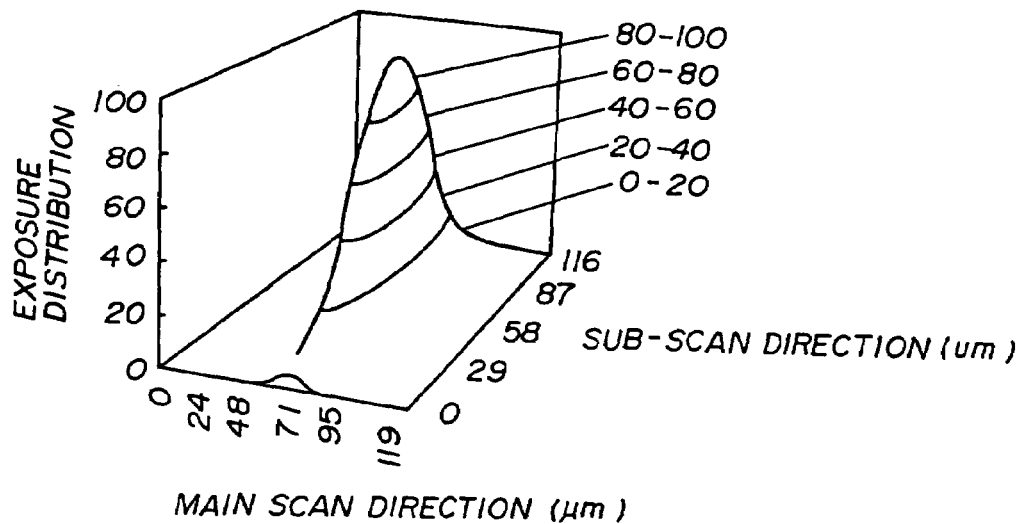
FIG. 16 shows a perspective view (bird's-eye view) of exposure distribution in the tenth embodiment of the present invention.
Figure 20:
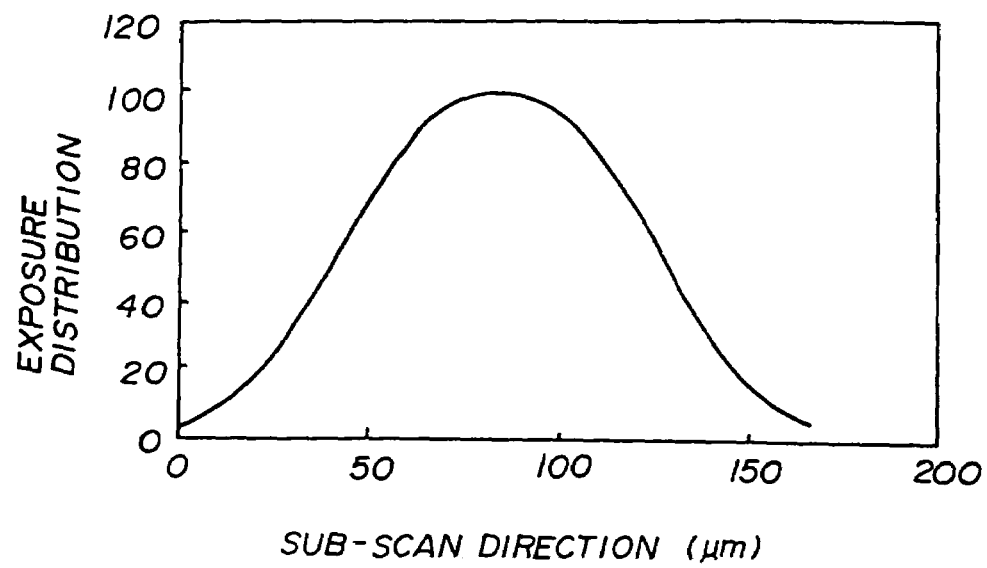
FIG. 20 shows an exposure distribution of the third embodiment of the present invention on a section parallel to the sub-scan direction and passing through a point at which the exposure distribution has the maximum value.
Figure 21:
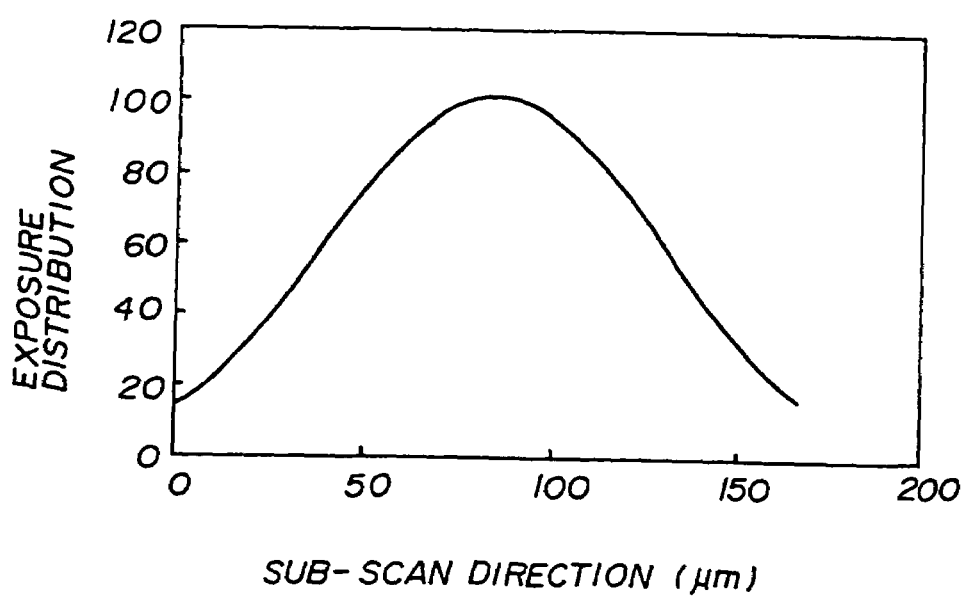
FIG. 21 shows an exposure distribution of the fourth embodiment of the present invention on a section parallel to the sub-scan direction and passing through a point at which the exposure distribution has the maximum value.
Figure 26:
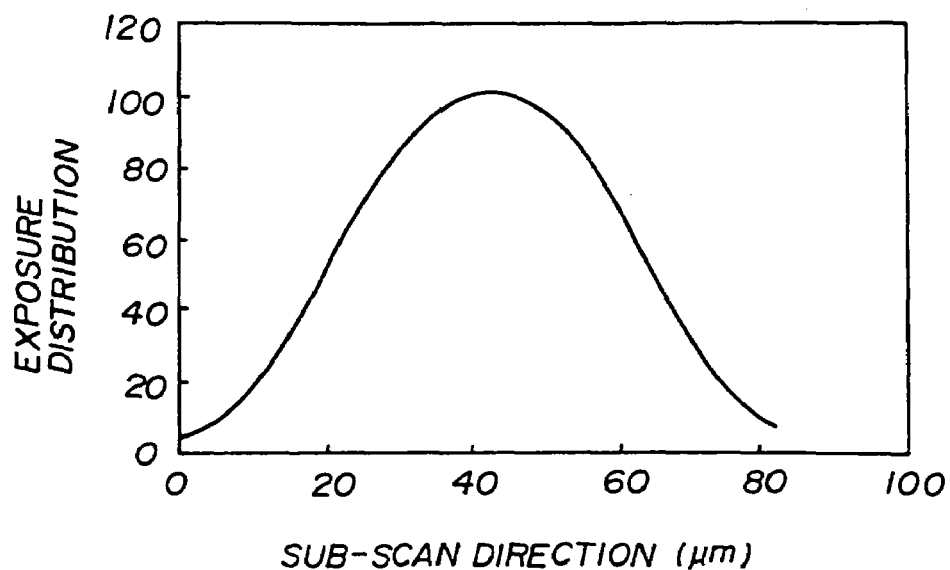
FIG. 26 shows an exposure distribution of the ninth embodiment of the present invention on a section parallel to the sub-scan direction and passing through a point at which the exposure distribution has the maximum value.
Figure 27:
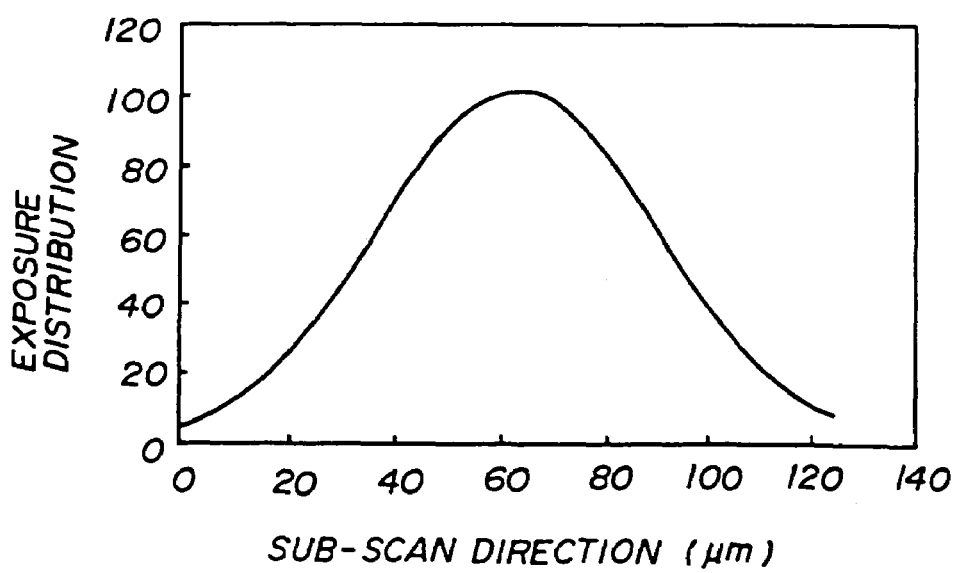
FIG. 27 shows an exposure distribution of the tenth embodiment of the present invention on a section parallel to the sub-scan direction and passing through a point at which the exposure distribution has the maximum value.

In each of the embodiment 3 shown in FIGS. 9 and 20, the embodiment 4 shown in FIGS. 10 and 21, the embodiment 9 shown in FIGS. 15 and 26 and the embodiment 10 shown in FIGS. 16 and 27, 2.5<Ws/L<4.5. Accordingly, the exposure distribution has a peak at the center between adjacent scan lines. Accordingly, a new dot can be formed at the center between adjacent scan lines easily.

However, when Ws/L becomes equal to or higher than the upper limit (4.5) of the formula (1), the static beam-spot diameter in the sub-scan direction with respect to the scan-line interval L is too large, and, thereby, the new dot is too large, and/or is unstable. Accordingly, it is not possible to render high resolution.

When considering to render formation of a dot at the center between adjacent two scan lines and shortening of diameter of each image dot and stability of the image dots, it is preferable that the ratio of the static beam-spot diameter Ws in the sub-scan direction on the surface of the photosensitive body defined by $1/e^2$ of the maximum value in the exposure distribution of the beam spot to the scan-line interval L satisfies the following formula (3):

$$1.8 < Ws/L < 3.5 \quad (3)$$

Further, as shown in FIG. 5, each of the embodiments 1 through 10 satisfies the condition of the above-mentioned formula (2), and it is possible to render high resolution also in the main scan direction. However, it is preferable that the ratio of Wm to Ws satisfies the following formula:

$$Wm/Ws < 0.85$$

Although the light source used in each of the embodiments of the present invention is of a single light source, it is also possible that the light source is of a combination of a plurality of light sources is employed instead.

Further, although the light source used in each of the embodiments of the present invention is a laser light source, it is also possible that the light source includes a plurality of LEDs (Light Emitting Diodes) disclosed in Japanese Laid-Open Patent Application No. 10-250144.

Furthermore, although the static beam-spot shape in each embodiment is assumed to be of an ideal Gaussian distribution, it is also possible that it is slightly different from a shape of an ideal Gaussian distribution.

The present invention is not limited to the above-described embodiments, and variations and modifications may be made without departing from the scope of the present invention.

The present application is based on Japanese priority application No. 2000-026780 filed on Feb. 3, 2000, the entire contents of which are hereby incorporated by reference.

What is claimed is:

1. An image forming apparatus, comprising:

a photosensitive body; and an optical scanning device having a deflector deflecting a light flux emitted from a light source, and scanning a surface of said photosensitive body by the thus-deflected light flux formed as a beam spot in a main scan direction along main scan lines separated from one another in a sub-scan direction on said surface of said photosensitive body, wherein said image forming apparatus is configured such that new dots are formed centered between adjacent main scan lines in areas exposed to overlapping beam spot portions when an exposure intensity exceeds 50% of a maximum value there, wherein each beam spot has a first static beam-spot diameter Ws in said sub-scan direction on said surface of said photosensitive body and a second static beam-spot diameter Wm in said main scan direction on said surface of said photosensitive body, each static beam-spot diameter being defined by $1/e^2$ of a maximum value in an exposure distribution of the associated beam spot, wherein a ratio of a first static beam-spot diameter Ws to an interval L between adjacent scan lines satisfies the following formula:

$$1.2 < Ws/L < 4.5, \text{ and}$$

wherein a ratio of said second static beam-spot diameter Wm to the first static beam-spot diameter Ws satisfies the following formula:

$$Wm/Ws < 1.$$

2. An image forming apparatus, comprising:
photosensitive means having a photosensitive layer; and
an optical scanning means having deflecting means for deflecting a light flux emitted by light emitting means, and scanning the surface of said photosensitive means by the thus-deflected light flux formed as a beam spot in a main scan direction along main scan lines separated from one another in a sub-scan direction on said surface of said photosensitive body,
wherein a dot is formed at a center between adjacent main scan lines as a result of adjacent beam spot portions being overlapped with one another in said sub-scan direction,
wherein each beam spot has a first static beam-spot diameter Ws in said sub-scan direction on said surface of said photosensitive body and a second static beam-spot diameter Wm in said main scan direction on said surface of said photosensitive body, each static beam-spot diameter being defined by $1/e^2$ of a maximum value in an exposure distribution of the associated beam spot,
wherein a ratio of said first static beam-spot diameter Ws to an interval L between adjacent scan lines satisfies the following formula:

$1.2 < Ws/L < 4.5$, and wherein a ratio of said second static beam-spot diameter Wm to the first static beam-spot diameter Ws spots satisfies the following formula:

$Wm/Ws < 1$.

3. A laser beam printer which employs an image forming apparatus, comprising:
a photosensitive body; and
an optical scanning device having a deflector deflecting a laser beam emitted from a laser beam source, and scanning a surface of said photosensitive body by the thus-deflected laser beam as a beam spot in a main scan direction along main scan lines separated from one another in a sub-scan direction on said surface of said photosensitive body,
wherein said image forming apparatus is configured such that new dots are formed centered between adjacent main scan lines in areas exposed to overlapping beam spot portions when an exposure intensity exceeds 50% of a maximum value there,
wherein each beam spot has a first static beam-spot diameter Ws in said sub-scan direction on said surface of said photosensitive body and a second static beam-spot diameter Wm in said main scan direction on said surface of said photosensitive body, each static beam-spot diameter being defined by $1/e^2$ of a maximum value in an exposure distribution of the associated beam spot,
wherein a ratio of said first static beam-spot diameter Ws to an interval L between adjacent scan lines satisfies the following formula:

$1.2 < Ws/L < 4.5$, and wherein a ratio of said second static beam-spot diameter Wm to the first static beam-spot diameter Ws satisfies the following formula:

$Wm/Ws < 1$.

4. A laser beam printer which employs an image forming apparatus, comprising:
photosensitive means having a photosensitive layer; and
an optical scanning means having deflecting means for deflecting a laser beam emitted by laser beam emitting means, and scanning the surface of said photosensitive means by the thus-deflected laser beam as a beam spot in a main scan direction along main scan lines separated from one another in a sub-scan direction on said surface of said photosensitive means,
wherein a dot is formed at a center between adjacent main scan lines as a result of adjacent beam spot portions being overlapped with one another in said sub-scan direction,
wherein each beam spot has a first static beam-spot diameter Ws in said sub-scan direction on said surface of said photosensitive means and a second static beam-spot diameter Wm in said main scan direction on said surface of said photosensitive means, each static beam-spot diameter being defined by $1/e^2$ of a maximum value in an exposure distribution of the associated beam spot,
wherein a ratio of said first static beam-spot diameter Ws to an interval L between adjacent scan lines satisfies the following formula:

$1.2 < Ws/L < 4.5$, and wherein a ratio of said second static beam-spot diameter Wm to the static beam-spot diameter Ws satisfies the following formula:

$Wm/Ws < 1$.

* * * * *